US005502455A

United States Patent [19]

Ferrin et al.

[11] Patent Number: 5,502,455
[45] Date of Patent: Mar. 26, 1996

[54] METHOD AND APPARTUS FOR PRODUCING A SYMBOLOGY DISPLAY INTO A NIGHT VISION SYSTEM

[75] Inventors: Frank J. Ferrin, Plymouth; Paul N. Turner, Columbia Heights, both of Minn.

[73] Assignee: Honeywell Inc., Minneapolis, Minn.

[21] Appl. No.: 278,466

[22] Filed: Jul. 21, 1994

[51] Int. Cl.⁶ .................................................. G09G 5/00
[52] U.S. Cl. ........................................... 345/9; 359/630
[58] Field of Search ............. 345/7, 8, 9; 359/628–633; 351/158; 250/213 VT, 214 VT

[56] References Cited

U.S. PATENT DOCUMENTS

| H779 | 5/1990 | Verona | 345/8 |
|---|---|---|---|
| 3,170,979 | 2/1965 | Baldwin et al. | 345/8 |
| 4,818,065 | 4/1989 | Ziph et al. | 350/174 |
| 4,915,487 | 4/1990 | Riddell, III et al. | 350/174 |
| 4,969,724 | 11/1990 | Ellis | 350/503 |
| 5,079,416 | 1/1992 | Filipovich | 250/213 |
| 5,082,337 | 1/1992 | Chern et al. | 359/15 |
| 5,083,246 | 1/1992 | Lambert | 362/62 |
| 5,113,177 | 5/1992 | Cohen | 340/705 |
| 5,124,892 | 6/1992 | Lambert | 362/103 |
| 5,129,716 | 7/1992 | Holakovszky | 359/630 |
| 5,181,013 | 1/1993 | Bagshaw et al. | 340/702 |
| 5,208,514 | 5/1993 | Bassick | 318/560 |
| 5,229,598 | 7/1993 | Filipovich | 250/214 VT |
| 5,233,458 | 8/1993 | Moffitt et al. | 359/227 |
| 5,299,063 | 3/1994 | Fritz et al. | 359/631 |

OTHER PUBLICATIONS

Title: "Night Vision/Head–Up Display AN/AVQ–35" Author: Elbit Systems of America.
Title: Symbology Night Vision Goggles for Combat Aircraft Author: G. J. N. Clarkson (SPIE vol. 2218, pp. 316–326).
Title: ANVIS Display Symbology System (ADSS) Author: Paul D. Travesky (Department of the Army).
Title: ANVIS Display Symbology System Author: Honeywell (Defense Avionics Systems Division).
Title: –903 Optical Display Assembly Development Log Author: Mike Pyne.

Primary Examiner—Richard Hjerpe
Assistant Examiner—Steven J. Saras
Attorney, Agent, or Firm—Charles J. Ungemach

[57] ABSTRACT

Apparatus and method for introducing superimposed symbology from a CRT into a dimly lit scene being viewed through a viewing device by utilizing a very small mirror to reflect symbology from the source to the viewing device while minimizing the interference of the reception of light from the dimly lit scene by the viewing device, reducing the light from the source to a level consistent with that from the dimly lit scene and decreasing the aperture from the source so that the symbology remains in focus over a large depth of focus.

9 Claims, 1 Drawing Sheet

METHOD AND APPARATUS FOR PRODUCING A SYMBOLOGY DISPLAY INTO A NIGHT VISION SYSTEM

BACKGROUND OF THE INVENTION

1. Field of the Invention

The present invention relates to night vision apparatus and more particularly to a method and apparatus for producing a superimposed image of desired symbology on the view being seen in the night vision system.

2. Description of the Prior Art

Night vision systems are well known in the art. For example, the U.S. Government's Aviator's Night Vision System (ANVIS) goggle comprises a binocular arrangement containing apparatus for image intensifying low intensity light which is normally available from starlight or moonlight on a scene being viewed.

Apparatus for superimposing information on a scene being viewed through an optical system is also known in the art. Helmet mounted displays such as found in U.S. Pat. Nos. 5,113,177 and 5,299,063 utilize a partially silvered area on the helmet visor upon which information or symbology from a CRT is projected so as to be superimposed on the scene being viewed by the wearer. Binocular night vision systems having superimposed images thereon are also known as is shown in U.S. Pat. Nos. 4,915,487 and 5,079,416. In all of these systems a partially silvered mirror or prism is placed in the line of vision of the system so that information from the CRT can be reflected therefrom and combined with the view being seen by the wearer.

FIG. 1, although not specifically showing a prior art device, nevertheless shows a way that symbology could be introduced into the scene being viewed by a night vision system using conventional thinking. In FIG. 1, one ocular of the ANVIS night vision goggles, is shown by reference numeral 10. This device receives light from a dimly lit scene over a path shown by arrows 12 through a partially silvered mirror 14. The ANVIS contains image intensifiers which operate to increase the intensity of light received from the dimly lit scene. To inject desired symbology on this scene a cathode ray tube 20 is shown clamped to the ANVIS 10 by clamping member 22. Light from the CRT 20 passes generally along an axis shown by dash dot line 23 through a reflecting prism 24 and along and axis shown as dash dot line 25 through collimating lenses 26 and 28 to the partially silvered mirror 14 where the light from the CRT 20, shown by three sets of rays 29a, 29b and 29c, are then combined with the light passing through mirror 14 from arrows 12 so that the viewer sees both images simultaneously (only a few representative ray paths have been shown for simplicity). A CRT focusing ring 30 is utilized to cause the image seen by the viewer to be in focus. Connections such as 32 and 34 may be utilized to provide power and input information to the CRT in well known fashion.

Several difficulties arise with respect to the prior art and the apparatus of FIG. 1. A first problem arises because ANVIS 10 intensifies light which it receives and normally this light is very dim as received over paths such as shown by arrows 12. The light from the CRT, on the other hand, is much brighter than the dimly scene and accordingly the symbology which is displayed must be diminished to prevent the image intensifier tube in ANVIS 10 from being damaged. Of course filters or intensity modifiers can be utilized to reduce the amount of light from the CRT but such additional apparatus increases the weight, size and complexity of the system.

Another problem lies in the fact that the partially silvered mirror 14 allows only part of the light along paths such as arrows 12 to be received by ANVIS 10. As mentioned this light is already very dim and losing part of it makes the losses even greater in a very undesirable fashion and unbalances the intensities between the two oculars.

A third problem arises because the ANVIS night vision goggle has an adjustable focus so that it may view objects from far away and near. When the goggle changes it's focus, the image produced by the CRT may move out of focus. An additional adjustment of the CRT focus ring 30 will then be necessary.

BRIEF DESCRIPTION OF THE PRESENT INVENTION

The present invention overcomes the problems encountered in the prior art by recognizing that all of the light from the CRT 20 shown in FIG. 1 need not be utilized. More particularly a very small reflector may be utilized to transfer information from the CRT to the input lens of the ANVIS. This has the advantage of not only reducing the amount of light from the CRT in a desirable fashion but also greatly reducing the amount of interference with the light being received from the dimly lit scene. Also, since the small reflecting surface effectively cuts down the aperture of the optical system from the CRT and by doing so increases the depth of focus of the system. Thus, when the operator changes the focus of the ANVIS, the CRT will not have to be refocused since it will remain focused over a large range.

DETAILED DESCRIPTION OF THE PREFERRED EMBODIMENTS

Figure 1:
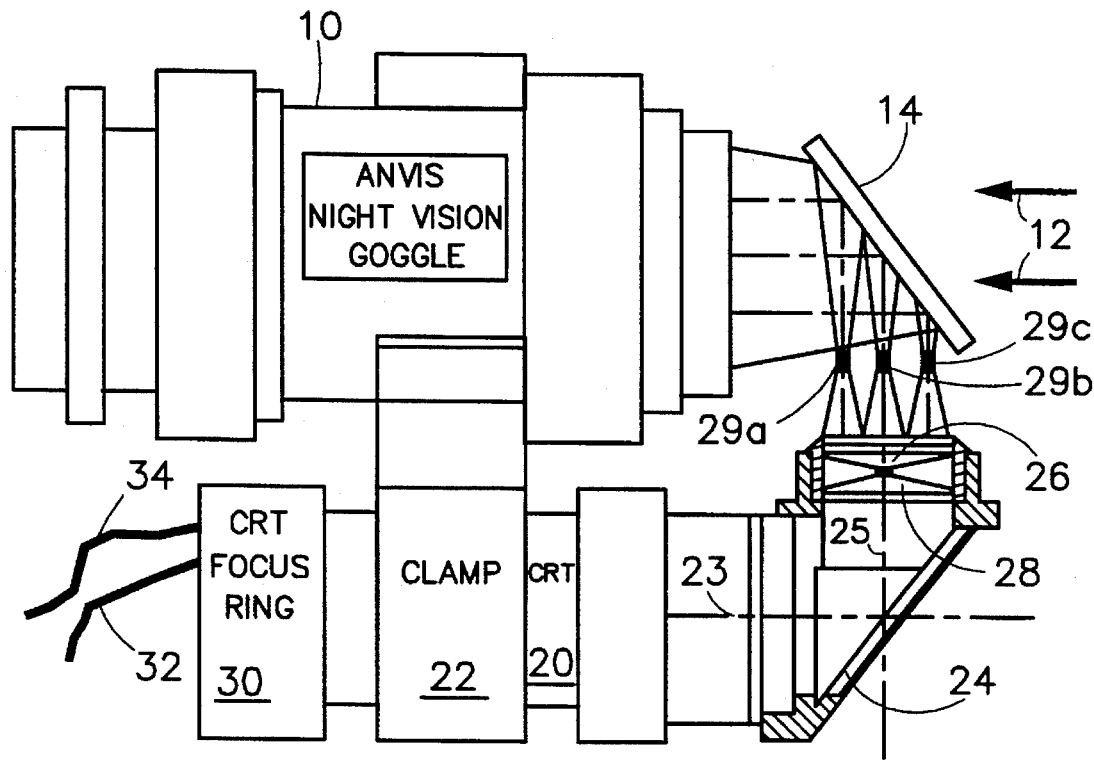
FIG. 1 shows a night vision system with a cathode ray tube symbol injector arranged according to conventional thinking.
Figure 2:
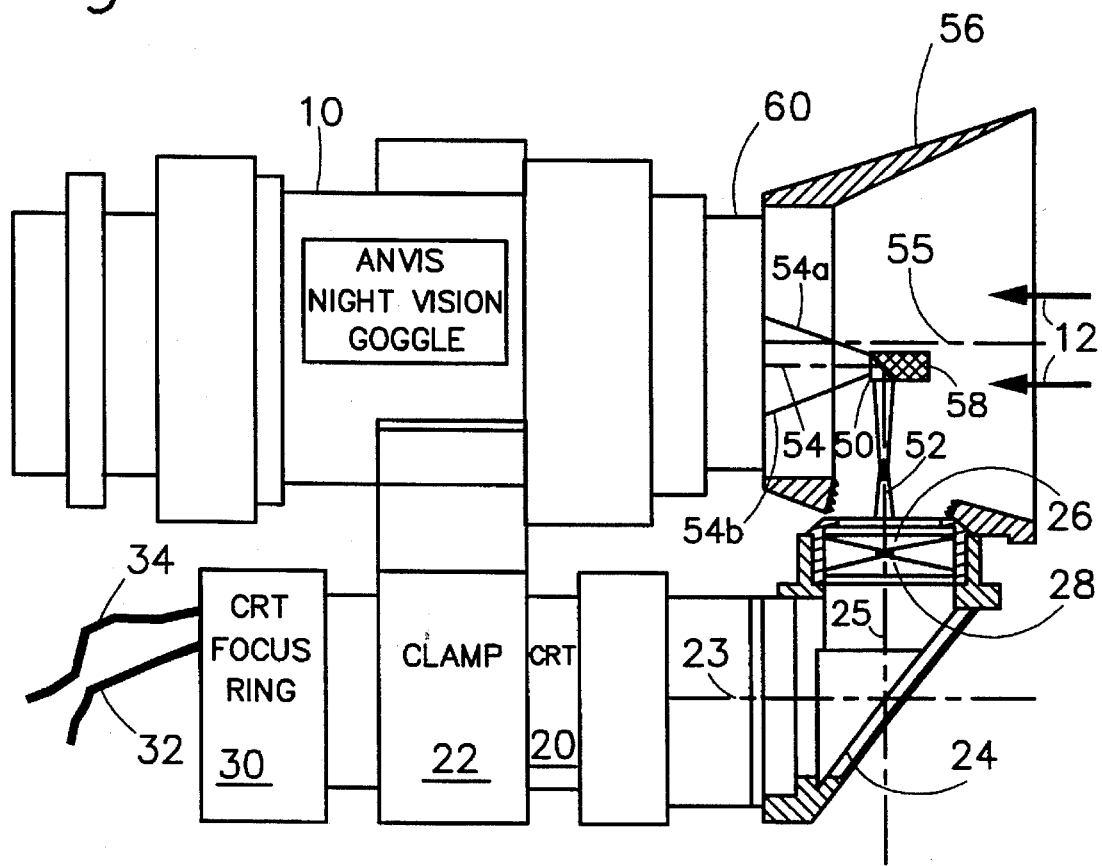
FIG. 2 shows the preferred embodiment of the present invention.

Referring now to FIG. 2, the apparatus which is common to that of FIG. 1 has been given the same reference numerals. In FIG. 2 ANVIS 10 is again shown receiving light from a dimly lit scene over paths such as shown by arrows 12. A CRT 20 is shown clamped to the ANVIS with a removable clamp 22 for convenient mounting of the CRT and the associated apparatus. Light from the CRT passes generally along an axis shown by dash dot line 23, is reflected from a prism 24 and passes along an axis shown by dash dot line 25 through collimating lenses 26 and 28 where it passes to a very small reflecting prism 50 along an axis generally shown by dash dot line 52. Prism 50 in one preferred embodiment, has a one and one half millimeter by one and one half millimeter input and output surface. The prism 52 reflects a relatively small portion of the light from the CRT 10 to ANVIS 10 along an axis shown by dash dot line 54. The optic axis of the ANVIS goggle as shown is a dash dot line 55 and it will be noticed that the prism 50 is located just below axis 55 although it's position may be on axis 55 or at any other location which provides the proper cone of light shown by lines 54a and 54b as will be explained. If desired, the input of ANVIS 10 may be provided with an input hood 56 to help minimize extraneous light and protect the optical elements.

Prism 50 is shown mounted in a small interior support member or beam 58 which extends into and out of the plane of FIG. 2 and may be attached to the hood 56 for firmly positioning the prism 50.

Light from the reflecting prism 24 passes to the small reflecting prism 50 where it is substantially totally reflected to the objective lens or input 60 of ANVIS 10 to illuminate an area defined by the lines 54a and 54b. The system needs to be designed in such a fashion that the angular separation between lines 54a and 54b is sufficient to provide the desired symbology to the eye of the viewer. In one example for which the one preferred embodiment described herein was made, the U.S. Government required a field of view of 40 degrees so the prism 50 was designed to provide 20 degrees between each of lines 54a and 54b and to axis 54 i.e. a 40 degree spread.

It will be noted that the structure including prism 50 and supporting member 58 occupy only a very small portion of the light path from the scene and the light therefrom, as shown by arrows 12, is nearly all received by the ANVIS 10. It will also be noticed that since only a very small prism 50 is utilized most of the light from the CRT is not reflected into the objective lens of the ANVIS and accordingly the amount of light received thereby is far less than was the case in FIG. 1. This is desirable since the apparatus inside ANVIS 10 operates to intensify the image and with less light coming from the CRT no additional filters or light diminishing devices are necessary.

It will also be seen that as the objective lens 60 moves back and forth to focus ANVIS 10, no additional focusing of the CRT focus ring 30 will be necessary since the depth of focus produced by the small aperture of the reflecting prism 50 will keep the CRT in focus throughout the normal range of focus of ANVIS 10. In the one preferred embodiment, the aperture provided an F number of 17.

It is, therefore, seen that we have provided a significant improvement in the insertion of symbology upon a scene being viewed by a night vision system. We have provided the superimposition of the symbology in a way that minimizes the obstruction of the low intensity light of the scene being viewed and which keeps the amount of light from the CRT at a low level consistent with the scene intensity. It is also seen that the CRT does not have to be focused each time the night vision system is focused.

It will be apparent to those skilled in the art that many changes may be made to the apparatus shown in connection with the preferred embodiment and accordingly we do not wish to be limited to the specific structures used in connection with the description thereof. For example, while we have employed prisms 24 and 50 for reflecting the light from the CRT to the night vision apparatus planar mirrors may be used or other light conducting devices. Also while the U.S. Government ANVIS night vision goggle has been used for describing the present invention, other suitable night vision apparatus may employ the teachings of the present invention.

Accordingly, we do not wish to be limited to the apparatus specifically described in connected with the preferred embodiment.

The embodiments of the invention in which an exclusive property or right is claimed are identified as follows:

1. Apparatus for providing superimposed symbology from a CRT into a scene being viewed through a night vision viewer having a first end portion to receive light from the scene and a second end portion to view the scene comprising:

an optical system positioned to conduct symbology from the CRT to the viewer, said optical system including a reflecting member positioned on a narrow beam member extending in air across the first end portion of the viewer in the path from the scene and being sized so as to reduce obstruction of the light from the scene, to reduce the amount of light from the CRT to a level compatible with the light from the scene and to reduce the aperture of the optical system in order to provide a large depth of focus.

2. Apparatus according to claim 1 wherein the reflecting member is positioned to provide a predetermined output angle of approximately 40 degrees.

3. Apparatus according to claim 1 wherein the reflecting member provides an input and output area of approximately one and one half millimeters by one and one half millimeters.

4. Apparatus according to claim 1 wherein the depth of focus is approximately equal to that produced by an optical system of F number 17.

5. Viewing apparatus comprising, in combination:

a pair of ANVIS goggle oculars for receiving radiation from a dimly lit scene and intensifying the radiation therefrom to produce a viewable image of the scene;

a CRT for producing desired symbology to be superimposed on the image;

a first reflecting surface to receive radiation from the CRT and direct it toward an area in the path of radiation from the scene and one of the ANVIS goggle oculars;

a second reflecting surface much smaller than the first reflecting surface, mounted on a narrow beam member in air in the area to reflect a small portion of the radiation from the first reflecting surface and direct it to the one ANVIS goggle ocular, the smaller size of the second reflector and the narrow beam blocking very little of the radiation from the scene; and means mounting the CRT and the first and second reflecting surfaces to the one of the ANVIS goggle oculars so as to combine the radiation from the CRT with the radiation from the scene.

6. Apparatus according to claim 5 wherein the small size of the second reflecting surface reduces the intensity of radiation from the CRT to a level compatible with the radiation from the scene.

7. Apparatus according to claim 5 wherein the first and second reflecting surfaces are sized to provide an optical path having an F number greater than 16.

8. Apparatus according to claim 5 wherein the second reflecting surface provides an input area not greater than two millimeters by two millimeters.

9. Apparatus according to claim 5 wherein the mounting means provides quick attachment and detachment of the CRT and first and second reflecting surfaces from the ANVIS goggle oculars.

\* \* \* \* \*